May 28, 1940.   F. PEEBLES   2,202,065
SEAT COVER
Filed June 27, 1938
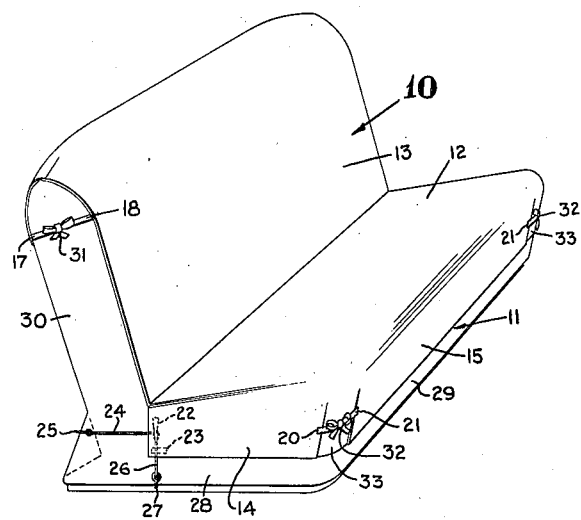
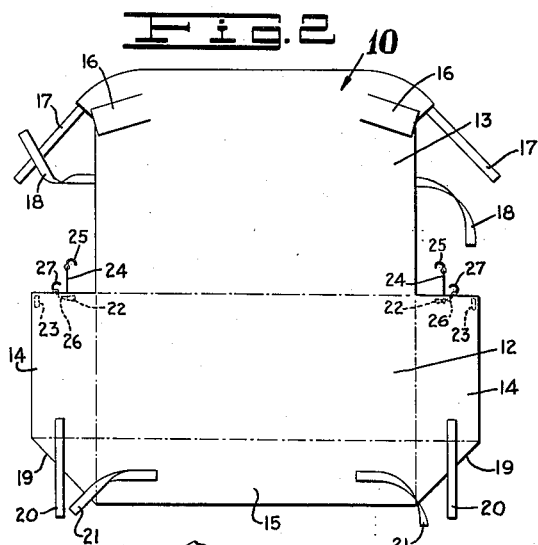
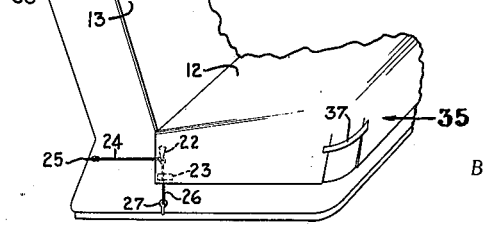
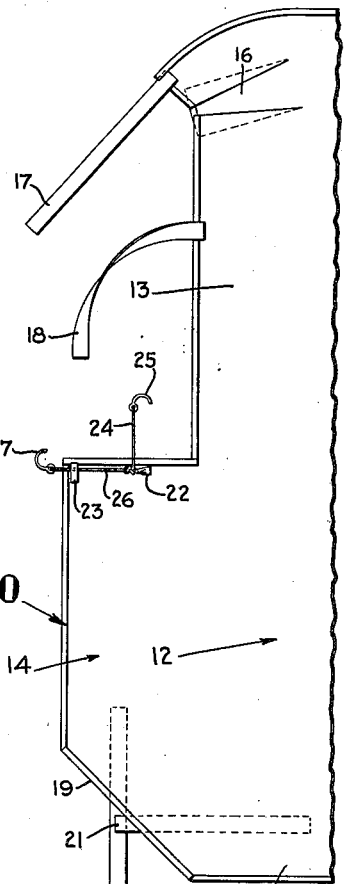
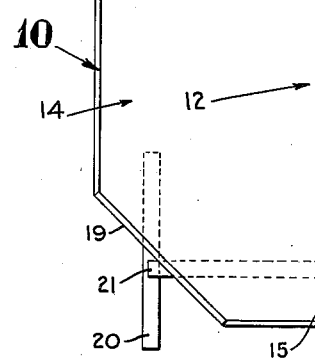
INVENTOR.
Fred Peebles
ATTORNEY.

Patented May 28, 1940

2,202,065

UNITED STATES PATENT OFFICE 2,202,065

SEAT COVER

Fred Peebles, Pasadena, Calif.

Application June 27, 1938, Serial No. 216,043

1 Claim. (Cl. 155—182)

This invention relates to improvements in seat covers.

The general object of this invention is to provide an improved cover for the seat of an automobile.

Another object of the invention is to provide a novel, quickly attachable and detachable cover for the seat of an automobile.

A further object of the invention is to provide an automobile seat cover including novel means for attaching the cover to the seat.

Other objects and the advantages of this invention will be apparent from the following description taken in connection with the accompanying drawing, wherein:

Fig. 1 is a perspective view of an automobile seat showing my improved cover operatively positioned thereon.

Fig. 2 is a plan view of the seat cover removed from a seat showing the outer face thereof;

Fig. 3 is an enlarged fragmentary plan view of the rear face of the cover; and

Fig. 4 is a fragmentary view similar to Fig. 1 showing a slightly modified form of seat cover.

Referring to the drawing by reference characters I have indicated my improved seat cover generally at 10 and in Fig. 1 have shown it operatively positioned on an automobile seat 11. As shown the cover 10 is made of a heavy grade of cloth and includes a seat portion 12, a back portion 13, extended side portions 14 and a front portion 15.

Adjacent the outer edge thereof the back portion 13 is shown as provided with folded tucks indicated at 16 to shape it to conform to the shape of the particular seat to which it is to be attached. Extending from each side adjacent the outer end thereof the back portion 13 includes a rear cloth tape 17 and a front tape 18. At the juncture of the sides 14 and the front 15 the cover includes angular portions indicated at 19.

Each of the side portions 14 includes a forwardly extending cloth tape 20 and adjacent each side thereof the front portion includes a sidewardly extending tape 21. Adjacent the rear edge and intermediate the width thereof each of the side portions 14 includes an outwardly directed loop member 22 and adjacent the outer rear edge each of the side portions includes a rearwardly directed loop member 23.

To each of the loops 22 I secure one end of an elastic band 24 the opposite end of which has a metal hook member 25 thereon. Furthermore to each of the loops 22 I secure one end of an elastic band 26 the opposite end of which has a metal hook member 27 thereon.

When applying the cover 10 to an automobile seat such as the seat 11 shown in Fig. 1 the seat portion 12 is positioned on the horizontal portion of the seat with the side portions 14 extending downward over the sides 28 of the seat and with the front portion 15 extending downward over the front 29 of the seat. The back portion 13 of the cover is extended upwardly over the front of the back 30 thence over the upper edge thereof and part way down the rear thereof.

Each set of the tapes 17 and 18 is tied as indicated at 31 and each set of the tapes 20 and 21 is tied as indicated at 32 after correctly folding the angular portion 19 to fit the corner of the seat as indicated at 33.

Each of the elastic bands 26 is then threaded through its adjacent loop 23 as shown in Fig. 3 and the hooks 27 thereon are hooked under an adjacent portion of the seat 11 as shown in Fig. 1. Each of the elastic bands 24 is then stretched rearwardly and the hooks 25 thereon are hooked around a portion of the rear of the seat.

From the foregoing it will be apparent that by the correct adjustment of the tapes 17 and 18 and the tapes 19 and 20 the seat cover 10 will be neatly fitted to the automobile seat and that the elastic fastening means firmly holds the seat cover in position.

In Fig. 4 I have shown a seat cover 35 which is similar in all respects to the seat 10 except that the tapes 17 and 18 are replaced by a single elastic member 36 and the tapes 20 and 21 are replaced by a single elastic band 37 thus eliminating the necessity of any tying thereby reducing the time required to place the seat cover on or remove it from an automobile seat.

From the foregoing description it will be apparent that I have provided a novel cover for the seat of an automobile which is simple in construction and highly efficient in use.

Having thus described my invention I claim:

In a seat cover, a piece of fabric cut to form a seat portion, a back portion, side portions and a front portion, said back portion having tucks therein to shape the back to correspond to the shape of the seat back on which it is to be attached, said back portion at the outer end thereof having a tape at each side, said back portion adjacent the outer end having another tape at each side spaced from the first tape, said tapes being adapted to be tied to hold the back portion in place, each of said side portions including a forwardly extending tape, said front portion adjacent each side thereof having a laterally extending tape, said last mentioned tapes being adapted to be secured together to hold the seat cover in place, each of said side portions including a pair of loops, an elastic band mounted on each of said side portions and extending through one of said loops, said elastic band having a hook thereon adapted to engage the seat, said side portions each having another elastic band thereon, said other elastic band being secured to the other loop and having a hook portion thereon adapted to engage the seat, said loops being arranged at right angles to each other and said elastic bands being arranged at right angles to each other.

FRED PEEBLES.